(12) United States Patent
McChesney et al.

(10) Patent No.: US 12,305,493 B2
(45) Date of Patent: May 20, 2025

(54) METHOD TO CREATE A FLUID MIXTURE WITH UNIFORM PROPERTIES PRIOR TO FLOWING INTO A FLUID FLOW CONTROL DEVICE

(71) Applicant: Halliburton Energy Services, Inc., Houston, TX (US)

(72) Inventors: Ryan W. McChesney, Carrollton, TX (US); Stephen Michael Greci, Carrollton, TX (US); Ryan M. Novelen, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/329,321

(22) Filed: Jun. 5, 2023

(65) Prior Publication Data
US 2024/0401444 A1 Dec. 5, 2024

(51) Int. Cl.
*E21B 43/12* (2006.01)
*B01D 17/02* (2006.01)

(52) U.S. Cl.
CPC .............. *E21B 43/12* (2013.01); *B01D 17/02* (2013.01)

(58) Field of Classification Search
CPC .... B01D 17/02; B01D 17/0217; B01D 45/14; B01D 17/0208; B01D 17/0211; B01D 17/0214; B01D 21/26; B01D 21/262; B01D 21/265; B01D 21/267; Y10S 494/901; E21B 43/12; F15D 1/025
See application file for complete search history.

(56) References Cited

U.S. PATENT DOCUMENTS

| | | | | |
|---|---|---|---|---|
| 368,544 A * | 8/1887 | Morrison | ........... | B01D 17/0214 48/128 |
| 1,920,565 A * | 8/1933 | Jones | ................. | B01D 17/0211 516/190 |
| 2,037,245 A * | 4/1936 | Leifheit | .................. | E21B 43/34 137/445 |
| 2,084,958 A * | 6/1937 | Hunter | ................. | B01D 17/045 516/197 |
| 3,260,572 A * | 7/1966 | Faugeras | .............. | B01D 17/045 196/127 |
| 6,581,859 B2 | 6/2003 | Adams et al. | | |
| 7,288,202 B2 * | 10/2007 | Maier | ....................... | C02F 1/38 96/155 |
| 8,262,909 B2 | 9/2012 | Angelescu et al. | | |

(Continued)

*Primary Examiner* — Kenneth L Thompson
(74) *Attorney, Agent, or Firm* — Scott Richardson; Parker Justiss, P.C.

(57) ABSTRACT

Provided is a fluid flow control device, a well system, and method. The fluid flow control device, in one aspect, includes an inlet port, an outlet port, and a fluid chamber positioned between the inlet and outlet ports. The fluid flow control device, in one aspect, may further include a float positioned within the fluid chamber, the float having a net density that is between a first density of a desired fluid and a second density of an undesired fluid, such that the float may control fluid flow through the fluid flow control device when encountering the desired fluid or undesired fluid. The fluid flow control device, in one aspect, may further include a fluid mixer positioned uphole of the fluid chamber, the fluid mixer configured to receive unmixed or partially mixed fluid and turn it to mixed inlet fluid prior to the mixed inlet fluid encountering the fluid chamber.

32 Claims, 15 Drawing Sheets

(56) References Cited

U.S. PATENT DOCUMENTS

| | | | |
|---|---|---|---|
| 9,150,443 B2 * | 10/2015 | Hengsperger | C02F 1/78 |
| 9,377,332 B2 | 6/2016 | Carapelli | |
| 9,453,395 B2 * | 9/2016 | Fripp | E21B 43/12 |
| 2008/0041580 A1 | 2/2008 | Freyer et al. | |
| 2013/0188169 A1 | 7/2013 | Harrison et al. | |
| 2015/0308226 A1 | 10/2015 | Killie et al. | |
| 2019/0055814 A1 | 2/2019 | Frosell et al. | |
| 2022/0403714 A1 | 12/2022 | McChesney et al. | |

* cited by examiner

METHOD TO CREATE A FLUID MIXTURE WITH UNIFORM PROPERTIES PRIOR TO FLOWING INTO A FLUID FLOW CONTROL DEVICE

BACKGROUND

Wellbores are sometimes drilled from the surface of a wellsite several hundred to several thousand feet downhole to reach hydrocarbon resources. During certain well operations, such as production operations, certain fluids, such as fluids of hydrocarbon resources, are extracted from the formation. For example, the fluids of hydrocarbon resources may flow into one or more sections of a conveyance, such as a section of a production tubing, and through the production tubing, uphole to the surface. During production operations, other undesirable types of fluids, such as water, sometimes also flow into the section of production tubing while the fluids of hydrocarbon resources are being extracted.

BRIEF DESCRIPTION

Reference is now made to the following descriptions taken in conjunction with the accompanying drawings, in which.

DETAILED DESCRIPTION

Figure 1:
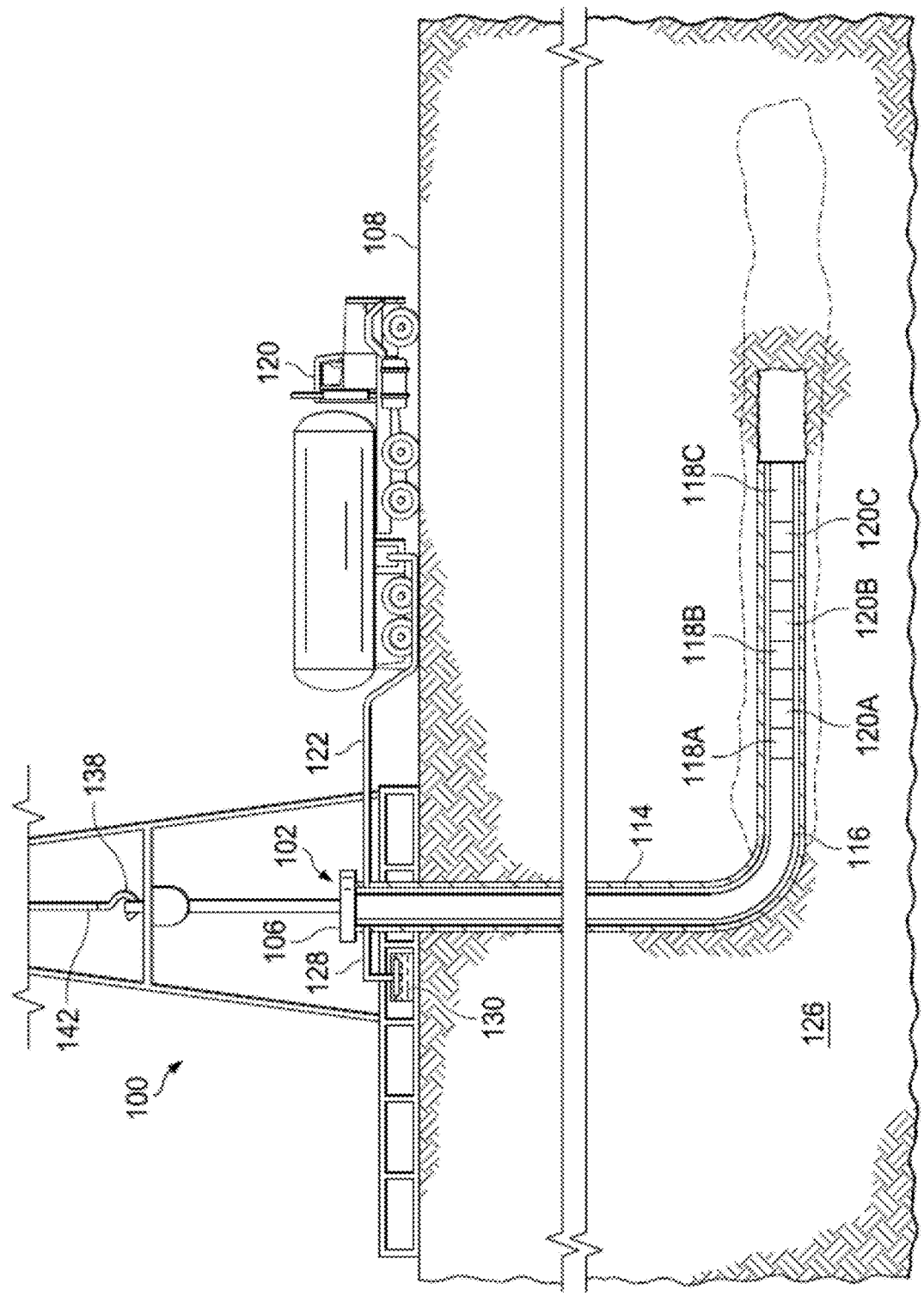
FIG. 1 illustrates a schematic, side view of a well system in which fluid flow control devices designed, manufactured and/or operated according to the disclosure are deployed in a wellbore.

In the drawings and descriptions that follow, like parts are typically marked throughout the specification and drawings with the same reference numerals, respectively. The drawn figures are not necessarily to scale. Certain features of the disclosure may be shown exaggerated in scale or in somewhat schematic form and some details of certain elements may not be shown in the interest of clarity and conciseness. The present disclosure may be implemented in embodiments of different forms.

Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed herein may be employed separately or in any suitable combination to produce desired results.

Unless otherwise specified, use of the terms "connect," "engage," "couple," "attach," or any other like term describing an interaction between elements is not meant to limit the interaction to direct interaction between the elements and may also include indirect interaction between the elements described. Unless otherwise specified, use of the terms "up," "upper," "upward," "uphole," "upstream," or other like terms shall be construed as generally away from the bottom, terminal end of a well, regardless of the wellbore orientation; likewise, use of the terms "down," "lower," "downward," "downhole," or other like terms shall be construed as generally toward the bottom, terminal end of a well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

The present disclosure relates, for the most part, to a fluid flow control device. The fluid flow control device, in at least one embodiment, includes an inlet port and an outlet port. The fluid flow control device, in at least this embodiment, also includes a float that is positioned in a fluid chamber between the inlet port and the outlet port. The float, in one or more embodiments, is operable to move between an open position that permits fluid flow through the outlet port and a closed position that restricts fluid flow through the outlet port. As referred to herein, an open position is a position of the float where the float does not fully restrict fluid flow through the outlet port, whereas a closed position is a position of the float where the float restricts fluid flow through the outlet port. In some embodiments, the float shifts radially inwards toward the outlet port to move from an open position to a closed position, and shifts radially outwards away from the outlet port to move from the closed position to the open position. In some embodiments, the float shifts radially outwards toward the outlet port to move from an open position to a closed position, and shifts radially inward away from the outlet port to move from the closed position to the open position. In some other embodiments, the float is hinged such that as the body of float shifts radially outward while another portion of the float shifts radially inward, whether to open or close the outlet port. As referred to herein, radially inwards means shifting radially towards the center, such as the central axis, whereas radially outwards means shifting away from the center, such as away from the central axis.

In some embodiments, the float shifts circumferentially (such as circumferentially about a flow pathway of a port) from a first position to a second position to move from an open position to a closed position, and shifts from the second position to the first position to move from the closed position to the open position. In some embodiments, the float shifts linearly from a first position to a second position to move from an open position to a closed position, and shifts linearly from the second position to the first position to move from the closed position to the open position. In yet another embodiment, the float is contained within an enclosure of fluid that it is able to substantially freely move within, the float operable to float from a first position to a second position to move from an open position to a closed position, and sink from the second position to the first position to move from the closed position to the open position, or vice versa.

In some embodiments, the float opens to permit certain types of fluids having densities that are less than a threshold density (such as oil and other types of hydrocarbon resources) to flow through the outlet port, and restricts other types of fluids having densities greater than or equal to the threshold density (such as water and drilling fluids) from flowing through the outlet port.

The present disclosure is based, at least in part, on the acknowledgment that problems exist in today's fluid flow control devices, particularly those that are fluid selective fluid flow control devices, such as inflow control devices (ICDs) and autonomous inflow control devices (AICDs). The present disclosure has recognized that one of the problems with today's fluid flow control devices is that they are not entirely accurate, opening when the inlet fluid composition is such that they should be closed, and vice versa. Specifically, the present disclosure has recognized for the first time that the accuracy of the fluid flow control device relates, at least in part, to whether the inlet fluid is properly mixed or not. The present disclosure has recognized that if the inlet fluid is not properly mixed, the fluid flow control device may react based upon one of the specific fluids, as opposed to a mixture of the fluids. For example, when using a fluid flow control device employing a turbine (e.g., as will be discussed below), if the specific fluids are not properly mixed prior to encountering the turbine, the high RPM of the turbine may act as a fluid separator, thereby separating out the specific fluids, and thus affecting the accuracy of the fluid flow control device.

The present disclosure has thus, for the first time, recognized that by mixing the fluids upstream of the fluid flow control device (e.g., upstream of the turbine in one embodiment), fluid stratification in the fluid flow control device may be reduced, if not eliminated. The fluid control device selectors may then operate based upon the bulk properties of the inlet fluid (e.g. net density of the mixed inlet fluid), rather than a position of the fluid parting line in the fluid flow control device.

Turning now to the figures, FIG. 1 illustrates a schematic side view of a well system 100 in which fluid flow control devices 120A-120C designed, manufactured and/or operated according to the disclosure are deployed in a wellbore 114. As shown in FIG. 1, wellbore 114 extends from surface 108 of well 102 to or through subterranean formation 126. A hook 138, a cable 142, traveling block (not shown), and hoist (not shown) may be provided to lower conveyance 116 into well 102. As referred to herein, conveyance 116 is any piping, tubular, or fluid conduit including, but not limited to, drill pipe, production tubing, casing, coiled tubing, and any combination thereof. Conveyance 116 provides a conduit for fluids extracted from formation 126 to travel to surface 108. In some embodiments, conveyance 116 additionally provides a conduit for fluids to be conveyed downhole and injected into formation 126, such as in an injection operation. In some embodiments, conveyance 116 is coupled to a production tubing that is arranged within a horizontal section of well 102. In the embodiment of FIG. 1, conveyance 116 and the production tubing are represented by the same tubing.

At wellhead 106, an inlet conduit 122 is coupled to a fluid source 120 to provide fluids through conveyance 116 downhole. For example, drilling fluids, fracturing fluids, and injection fluids are pumped downhole during drilling operations, hydraulic fracturing operations, and injection operations, respectively. In the embodiment of FIG. 1, fluids are circulated into well 102 through conveyance 116 and back toward surface 108. To that end, a diverter or an outlet conduit 128 may be connected to a container 130 at the wellhead 106 to provide a fluid return flow path from wellbore 114. Conveyance 116 and outlet conduit 128 also form fluid passageways for fluids, such as hydrocarbon resources to flow uphole during production operations.

In the embodiment of FIG. 1, conveyance 116 includes production tubular sections 118A-118C at different production intervals adjacent to formation 126. In some embodiments, packers (now shown) are positioned on the left and right sides of production tubular sections 118A-118C to define production intervals and provide fluid seals between the respective production tubular section 118A, 118B, or 118C, and the wall of wellbore 114. Production tubular sections 118A-118C include fluid flow control devices 120A-120C (e.g., inflow control devices or ICDs). A fluid flow control devices controls the volume or composition of the fluid flowing from a production interval into a production tubular section, e.g., 118A. For example, a production interval defined by production tubular section 118A produces more than one type of fluid component, such as a mixture of oil, water, steam, carbon dioxide, and natural gas.

Fluid flow control device 120A, which is fluidly coupled to production tubular section 118A, reduces or restricts the flow of fluid into the production tubular section 118A. In one or more embodiments, for example wherein the fluid flow control device 120A is an inflow control device (ICD), the fluid flow control device 120A may simply act as a restrictor or orifice to the flow of all fluids. In one or more embodiments, for example wherein the fluid flow control device 120A is an autonomous inflow control devices (AICD) and/or electronic inflow control devices (eICD), the fluid flow control device 120A may reduce or restrict the flow of fluid into the production tubular section 118A based upon the composition of the fluid, such as when the production interval is producing a higher proportion of an undesirable fluid component (e.g., water). Accordingly, this permits the other production intervals that are producing a higher proportion of a desired fluid component (e.g., oil) to contribute more to the production fluid at surface 108 of well 102, so that the production fluid has a higher proportion of the desired fluid component. In some embodiments, the AICD permits or restricts fluid flow into the production tubular sections 118A-118C based upon a composition of the fluid, such as viscosity, density, etc., without requiring signals from the well's surface by the well operator.

Although the foregoing paragraphs describe utilizing fluid flow control devices 120A-120C during production, in some embodiments, fluid flow control devices 120A-120C are also employed during other types of well operations to control fluid flow through conveyance 116. Further, although FIG. 1 depicts each production tubular section 118A-118C having a fluid flow control device 120A-120C, in some embodiments, not every production tubular section 118A-118C has a fluid flow control device 120A-120C. In some embodiments, production tubular sections 118A-118C (and fluid flow control devices 120A-120C) are located in a substantially vertical section additionally or alternatively to the substantially horizontal section of well 102. Further, any number of production tubular sections 118A-118C with fluid flow control devices 120A-120C, including one, are deployable in the well 102. In some embodiments, production tubular sections 118A-118C with fluid flow control devices 120A-120C are disposed in simpler wellbores, such as wellbores having only a substantially vertical section. In some embodiments, fluid flow control devices 120A-120C are disposed in cased wells or in open-hole environments.

In at least one embodiment, one or more of the fluid flow control devices 120A-120C include one or more fluid mixers designed, manufactured, and/or operated according to the disclosure. In accordance with at least one embodiment, the one or more fluid mixers are configured to receive unmixed or partially mixed fluid and turn it to mixed inlet fluid prior to the mixed inlet fluid encountering the fluid chamber of the fluid flow control device. Accordingly, a float of the fluid flow control device may act upon a net density of the mixed inlet fluid, as opposed to the density of one or more of the constituents of the fluid, thus providing more accurate control thereof.

Figure 2:
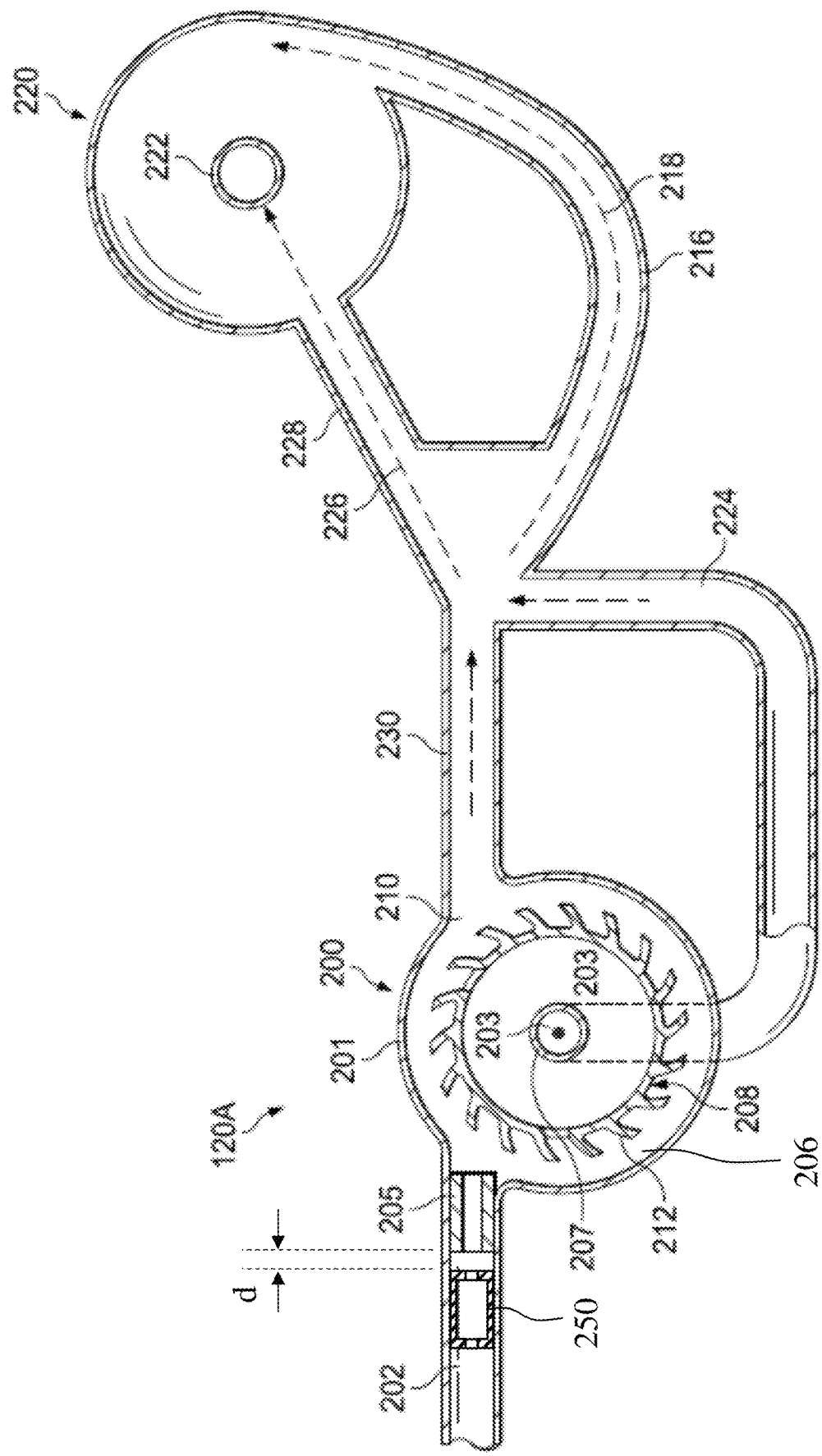
FIG. 2 illustrates a cross-sectional view of one embodiment of a fluid flow control device of FIG. 1 designed, manufactured and/or operated according to the disclosure.

FIG. 2 illustrates a cross-sectional view of one embodiment of a fluid flow control device 120A of FIG. 1 designed, manufactured and/or operated according to the disclosure. In the embodiments described in FIG. 2, fluid flow control device 120A includes an inflow tubular 200 of a well tool coupled to a fluid flow control device 202. Although the word "tubular" is used to refer to certain components in the present disclosure, those components have any suitable shape, including a non-tubular shape. Inflow tubular 200 provides fluid to fluid flow control device 202. In some embodiments, fluid is provided from a production interval in a well system or from another location. In the embodiment of FIG. 2, inflow tubular 200 terminates at an inlet port 205 that provides a fluid communication pathway into fluid flow control device 202. In some embodiments, inlet port 205 is an opening in a housing 201 of fluid flow control device 202. In one or more embodiments, the inlet port 205 is configured to increase a velocity of fluid exiting thereof.

A first fluid portion flows from inlet port 205 into a fluid chamber 206 and toward a bypass port 210. The first fluid portion pushes against fins 212 extending outwardly from a rotatable component 208 to rotate rotatable component 208 about an axis, such as a central axis 203. Rotation of rotatable component 208 about axis 203 generates a force on a float (not shown) positioned within rotatable component 208. After passing by rotatable component 208, the first fluid portion exits fluid flow control device 202 via bypass port 210. From bypass port 210, the first fluid portion flows through a bypass tubular 230 to a tangential tubular 216. The first fluid portion flows through tangential tubular 216, as shown by dashed arrow 218, into a vortex valve 220. In the embodiment of FIG. 2, the first fluid portion spins around an outer perimeter of vortex valve 220 at least partially due to the angle at which the first fluid portion enters vortex valve 220. Forces act on the first fluid portion, eventually causing the first fluid portion to flow into a central port 222 of vortex valve 220. The first fluid portion then flows from central port 222 elsewhere, such as to a well surface as production fluid.

At the same time, a second fluid portion from inlet port 205 flows into rotatable component 208 via holes in rotatable component 208 (e.g., holes between fins 212 of rotatable component 208). If the density of the second fluid portion is high, the float moves to a closed position, which prevents the second fluid portion from flowing to an outlet port 207, and instead cause the second fluid portion to flow out bypass port 210. If the density of the second fluid portion is low (e.g., if the second fluid portion is mostly oil or gas), then the float moves to an open position that allows the second fluid portion to flow out the outlet port 207 and into a control tubular 224. In this manner, fluid flow control device 202 autonomously directs fluids through different pathways based on the densities of the fluids. The control tubular 224 directs the second fluid portion, along with the first fluid portion, toward central port 222 of vortex valve 220 via a more direct fluid pathway, as shown by dashed arrow 226 and defined by tubular 228. The more direct fluid pathway to central port 222 allows the second fluid portion to flow into central port 222 more directly, without first spinning around the outer perimeter of vortex valve 220. If the bulk of the fluid enters vortex valve 220 along the pathway defined by dashed arrow 218, then the fluid will tend to spin before exiting through central port 222 and will have a high fluid resistance. If the bulk of the fluid enters vortex valve 220 along the pathway defined by dashed arrow 226, then the fluid will tend to exit through central port 222 without spinning and will have minimal flow resistance.

In some embodiments, the above-mentioned concepts are enhanced by the rotation of rotatable component 208. Typically, the buoyancy force generated by the float is small because the difference in density between the lower-density fluid and the higher-density fluid is generally small, and there is only a small amount (e.g., 5 milli-Newtons) of gravitational force acting on this difference in density. This makes fluid flow control device 202 sensitive to orientation, which causes the float to get stuck in the open position or the closed position. However, rotation of rotatable component 208 creates a force (e.g., a centripetal force or a centrifugal force) on the float. The force acts as artificial gravity that is much higher than the small gravitational force naturally acting on the difference in density. This allows fluid flow control device 202 to more reliably toggle between the open and closed positions based on the density of the fluid. This also makes fluid flow control device 202 perform in a manner that is insensitive to orientation, because the force generated by rotatable component 208 is much larger than the naturally occurring gravitational force.

In some embodiments, fluid flow control device 202 directs a fluid along the more direct pathway shown by dashed arrow 226 or along the tangential pathway shown by dashed arrow 218. In one or more of such embodiments, whether fluid flow control device 202 directs the fluid along the pathway shown by dashed arrow 226 or the dashed arrow 218 depends on the composition of the fluid. Directing the fluid in this manner causes the fluid resistance in vortex valve 220 to change based on the composition of the fluid.

In some embodiments, fluid flow control device 202 is compatible with any type of valve. For example, although FIG. 2 includes a vortex valve 220, in other embodiments, vortex valve 220 is replaced with other types of fluidic valves, including valves that have a moveable valve-element, such as a rate-controlled production valve. Further, in some embodiments, fluid control device 202 operates as a pressure sensing module in a valve.

In accordance with one embodiment, a fluid mixer 250 may be positioned uphole of the fluid chamber 206. In accordance with the present disclosure, the fluid mixer 250 is configured to receive unmixed or partially mixed fluid and turn it to mixed inlet fluid prior to the mixed inlet fluid encountering the fluid chamber 206. In at least one embodiment, the fluid mixer 250 is located uphole of the inlet port 205, such as shown in FIG. 2. For example, in at least one embodiment, the fluid mixer is positioned a distance (d) less than 1000 cm uphole of the inlet port 205. In at least one other embodiment, the fluid mixer is positioned a distance (d) less than 500 cm uphole of the inlet port 205, if not less than 100 cm uphole of the inlet port 205, if not less than 50 cm uphole of the inlet port 205, if not less than 25 cm uphole of the inlet port 205, if not less than 10 cm uphole of the inlet port 205, or less. In other embodiments, the fluid mixer 250 forms at least a portion of the inlet port 205, and thus may be integral thereto.

Figure 3:
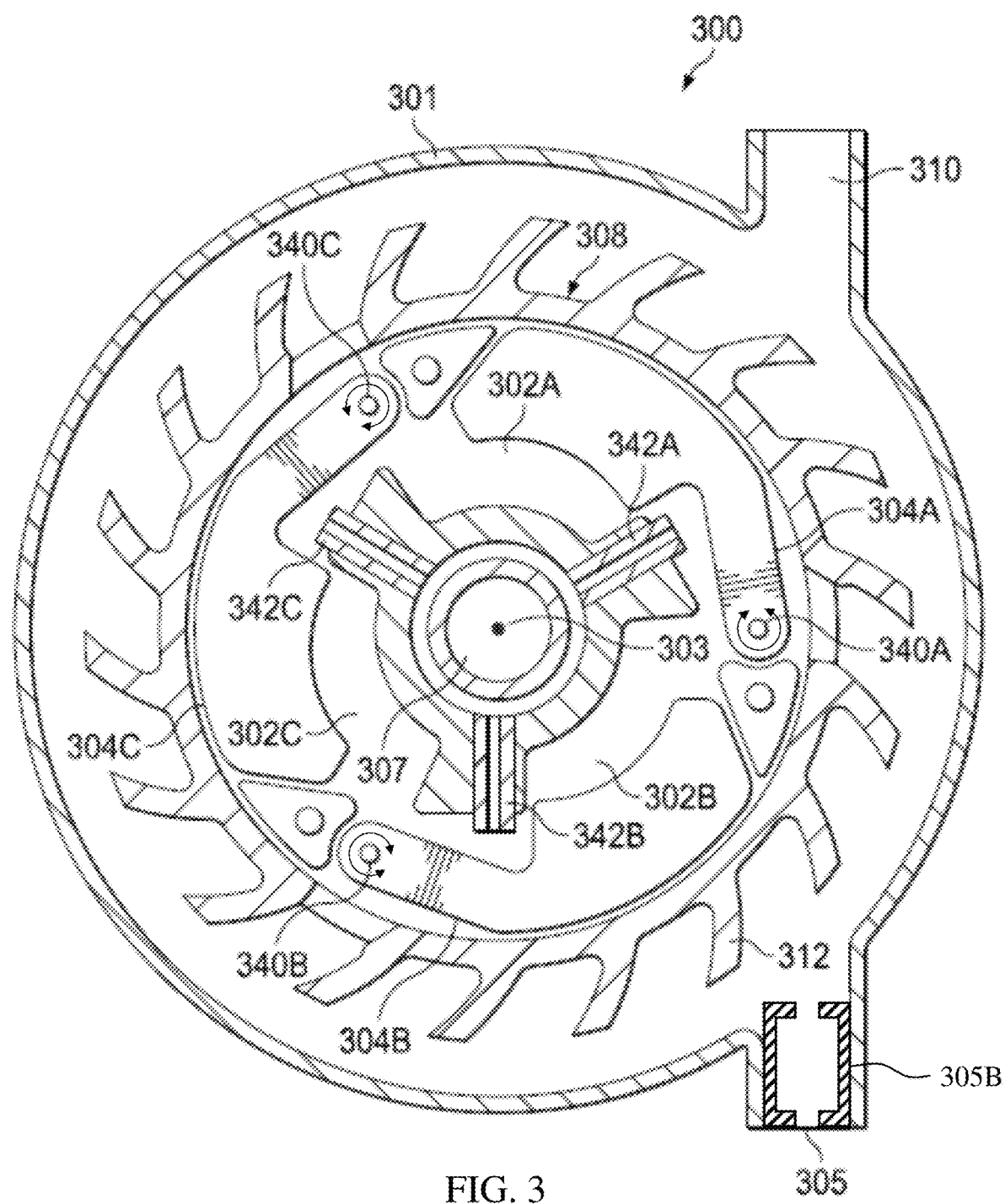
FIG. 3 illustrates a cross-sectional view of a fluid flow control device similar in certain embodiments to fluid flow control device of FIG. 2.

FIG. 3 is a cross-sectional view of a fluid flow control device 300 similar in certain embodiments to fluid flow control device 200 of FIG. 2. With reference now to FIG. 3, fluid flow control device 300 includes a rotatable component 308 positioned within a fluid chamber 301 of fluid flow control device 300. Fluid flow control device 300 also includes an inlet port 305 that provides a fluid passage for fluids such as, but not limited to, hydrocarbon resources, wellbore fluids, water, and other types of fluids to flow into fluid chamber 301. In the illustrated embodiment of FIG. 3, a fluid mixer forms at least a portion of the inlet port 305. For example, in the embodiment of FIG. 3, the fluid mixer 305B is integral to the inlet port 305. Accordingly, in at least the embodiment of FIG. 3, the inlet port 305 has mixing properties, and thus is configured to receive unmixed or partially mixed fluid and turn it to mixed inlet fluid prior to the mixed inlet fluid encountering the fluid chamber 301. While the embodiment of FIG. 3 indicates that the fluid mixer 305B is integral to the inlet port 305, other embodiments may exist wherein they are separate and discrete features. For example, in one or more embodiments the fluid mixer 305B is placed uphole of the inlet port 305, or in certain instances placed downhole of the inlet port 305.

Fluid control device 300 also includes an outlet port 310 that provides a fluid flow path for fluids to flow out of fluid flow control device 300, such as to vortex valve 220 of FIG. 2. Some of the fluids that flow into fluid chamber 301 also come into contact with rotatable component 308, where force generated by fluids flowing onto rotatable component 308 rotates rotatable component 308 about axis 303. In some embodiments, fluids flowing through inlet port 305 push against fins, including fin 312, which are coupled to rotatable component 308, where the force of the fluids against the fins rotates rotatable component 308 about axis 303. Three floats 304A-304C are positioned within the rotatable component 308 and are connected to the rotatable component 308 by hinges 340A-340C, respectively, where each hinge 340A, 340B, and 340C provides for movement of a respective float 304A, 304B, and 304C relative to rotatable component 308 between the open and closed positions. In some embodiments, movements of each float 304A, 304B, and 304C between the open and the closed positions are based on fluid densities of fluids in rotatable component 308, and particularly the mixed inlet fluid from the fluid mixer and/or inlet port 305.

In some embodiments, movement of floats 304A-304C back and forth between the open and closed positions is accomplished by hinging each respective float 304A, 304B, or 304C on its hinge 340A, 340B, or 340C. In some embodiments, each hinge 340A, 340B, and 340C includes a pivot rod (not shown) mounted to rotatable component 308 and passing at least partially through float 304A, 304B, and 304C, respectively. In some embodiments, in lieu of the pivot rod mounted to rotatable component 308, each float 304A, 304B, and 304C has bump extensions that fit into recesses of rotatable component 308 for use as a hinge. In some embodiments, floats 304A-304C are configured to move back and forth from the open and closed positions in response to changes in the net density of the mixed inlet fluids, including mixtures of water, hydrocarbon gas, and/or hydrocarbon liquids, introduced at inlet port 305. For example, floats 304A-304C are movable from the open position to the closed position in response to the fluid from inlet port 305 being predominantly water or mud, wherein the float component is movable from the closed position to the open position in response to the fluid from the inlet port 305 being predominantly a hydrocarbon, such as hydrocarbon gas, and/or hydrocarbon liquids.

In the embodiment of FIG. 3, rotatable component 308 includes three fluid pathways 342A-342C that provide fluid communication between inlet port 305 and an outlet port 307. Further, each fluid pathway 342A, 342B, and 342C is fluidly connected to a chamber 302A, 302B, and 302C, respectively. Moreover, each float 304A, 304B, and 304C is disposed in a chamber 302A, 302B, and 302C, respectively, such that shifting a float 304A, 304B, or 304C from an open position to a closed position restricts fluid flow through a corresponding fluid pathway 342A, 342B, or 342C, respectively, whereas shifting float 304A, 304B, or 304C from the closed position to the open position permits fluid flow through corresponding fluid pathway 342A, 342B, or 342C. In some embodiments, float 304A, 304B, or 304C permits or restricts fluid flow through fluid pathway 342A, 342B, or 342C, respectively, based on the net density of the mixed inlet fluid in chamber 302A, 302B, or 302C, respectively. Although FIG. 3 illustrates three floats 304A-304C positioned in three chambers 302A-202C, respectively, in some embodiments, a different number of floats positioned in a different number of chambers are placed in rotatable component 308. Further, although FIG. 3 illustrates three fluid pathways 342A-342C, in some embodiments, rotatable component 308 includes a different number of fluid pathways that fluidly connect inlet port 305 to outlet port 307.

Turning to FIGS. 4A through 4F, illustrated are cross-sectional views of a variety of different fluid mixers 400A-400F designed, manufactured, and/or operated according to one or more embodiments of the disclosure, as might be used with the fluid flow control device 300 of FIG. 3. For example, the fluid mixers 400A-400F could be configured to receive unmixed or partially mixed fluid and turn it to mixed inlet fluid prior to the mixed inlet fluid encountering the fluid chamber of the fluid flow control device (e.g., fluid chamber 301 of the fluid flow control device 300).

Figure 4A:
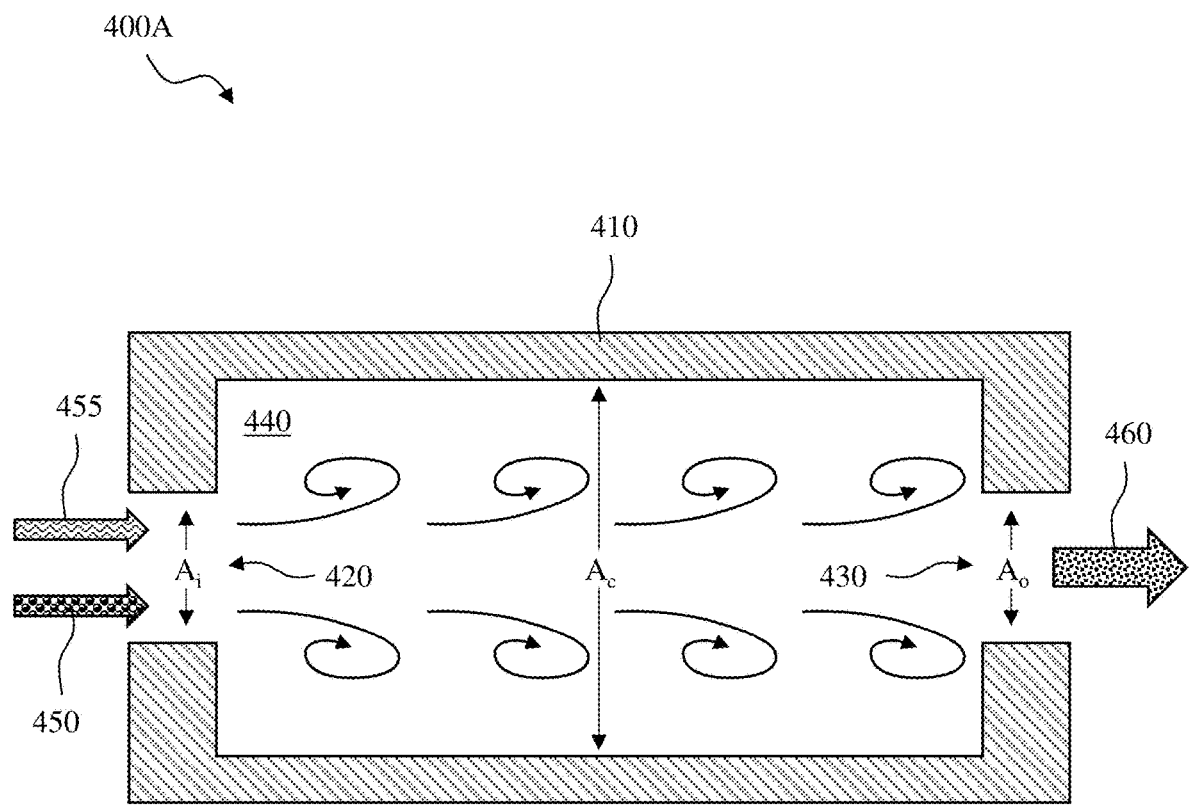
FIGS. 4A through 4F illustrate cross-sectional views of a variety of different fluid mixers designed, manufactured, and operated according to one or more embodiments of the disclosure, as might be used with the fluid flow control device of FIG. 3.

With initial reference to FIG. 4A, illustrated is one embodiment of a fluid mixer 400A designed, manufactured, and/or operated according to one or more embodiments of the disclosure. The fluid mixer 400A, in the illustrated embodiment, includes a housing 410. The housing 410 may comprise many different materials and remain within the scope of the disclosure. For example, in one or more embodiments, the housing 410 is a metal housing. In other embodiments, however, the housing 410 is a non-metal housing.

The housing 410, in one or more embodiments, includes a fluid mixer inlet 420 and a fluid mixer outlet 430. The fluid mixer inlet 420, in at least one embodiment, has a cross-sectional area ($A_i$), whereas the fluid mixer outlet 430, in at least one embodiment, has a cross-sectional area ($A_o$). The cross-sectional area ($A_i$) of the fluid mixer inlet 420 and the cross-sectional area ($A_o$) of the fluid mixer outlet 430 may or may not be the same. In certain embodiments, the cross-sectional area ($A_i$) of the fluid mixer inlet 420 is greater than the fluid mixer outlet 430 cross-sectional area ($A_o$) of the fluid mixer outlet 430, for example to increase a velocity of the mixed inlet fluid exiting the fluid mixer 300.

The housing 410, in the illustrated embodiment, additionally includes a fluid mixing chamber 440 positioned between the fluid mixer inlet 420 and the fluid mixer outlet 430. The fluid mixing chamber 440, in the illustrated embodiment, has a cross-sectional area ($A_c$). In one or more embodiments, the cross-sectional area ($A_c$) of the fluid mixing chamber 440 is larger than the cross-sectional area ($A_i$) of the fluid mixer inlet 420 and/or the cross-sectional area ($A_o$) of the fluid mixer outlet 430, thereby providing the mixing effect to the mixed inlet fluid. In at least one embodiment, the cross-sectional area ($A_c$) of the fluid mixing chamber 440 is at least 3 times the cross-sectional area ($A_i$) of the fluid mixer inlet 420 and/or the cross-sectional area ($A_o$) of the fluid mixer outlet 430. In at least one other embodiment, the cross-sectional area ($A_c$) of the fluid mixing chamber 440 is at least 5 times (e.g., if not at least 10 times, at least 15 times, at least 20 times, or more) the cross-sectional area ($A_i$) of the fluid mixer inlet 420 and/or the cross-sectional area ($A_o$) of the fluid mixer outlet 430.

In the embodiment of FIG. 4A, a first fluid 450 having a first fluid density and second fluid 455 having a second different fluid density enter the fluid chamber 440 via the inlet port 420. The embodiment of FIG. 4A illustrates that the first fluid 450 and the second fluid 455 are not mixed at all, nevertheless, in other embodiments the first fluid 450 and the second fluid 455 are partially mixed, but not fully mixed. What results after the first fluid 450 and the second fluid 455 entering the fluid chamber 440, is mixed inlet fluid 460 exiting the fluid chamber 440 via the outlet port 430. In one or more embodiments, the mixed inlet fluid 460 exiting the fluid mixer 400A is more mixed than a combination of the first fluid 450 and second fluid 455 entering the fluid mixer 400A. In at least one embodiment, the mixed inlet fluid 460 is a homogenous mixture (e.g., having a uniform net density). In yet another embodiment, the mixed inlet fluid 460 is an emulsified mixture (e.g., having a uniform net density.)

Figure 4B:
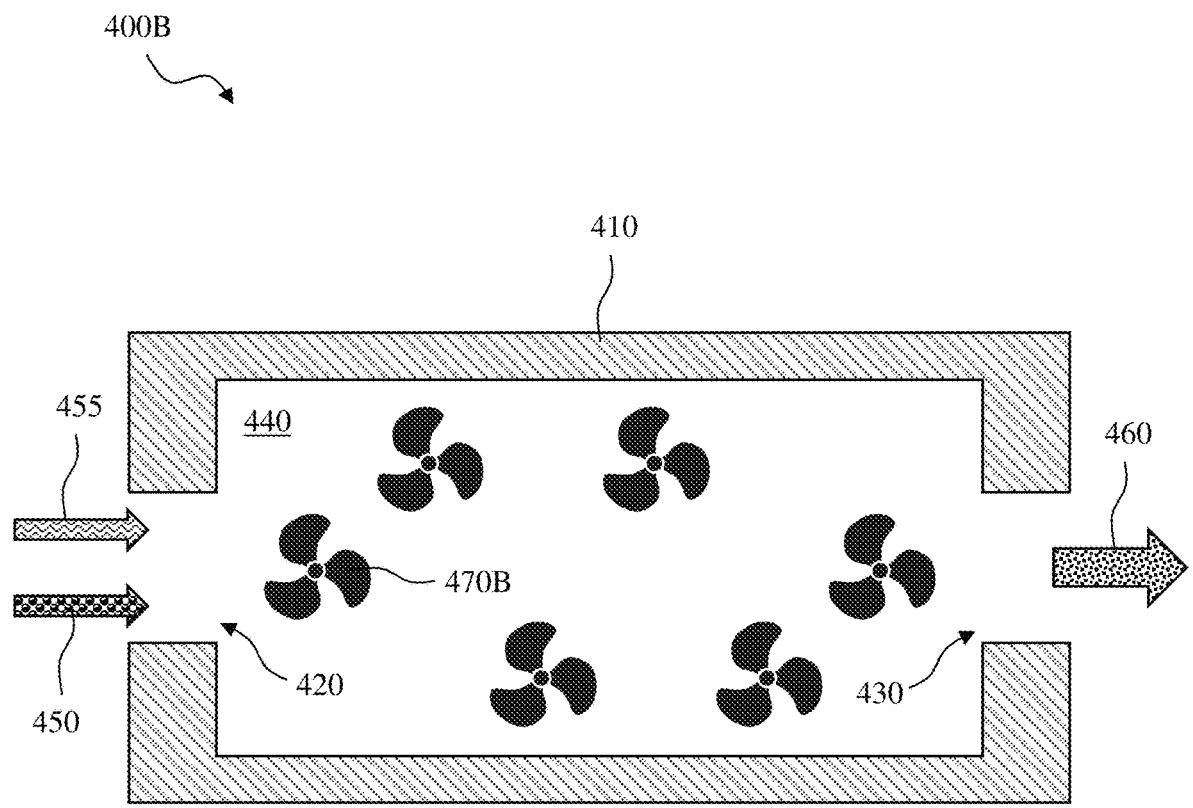

Turning now to FIG. 4B, illustrated is an alternative embodiment of a fluid mixer 400B designed, manufactured, and operated according to another embodiment of the disclosure. The fluid mixer 400B is similar in many respects to the fluid mixer 400A of FIG. 4A. Accordingly, like reference numbers have been used to indicate similar, if not identical, features. The fluid mixer 400B differs, for the most part, from the fluid mixer 400A in that the fluid mixer 400B employs one or more moving agitators 470B positioned within the fluid mixing chamber 440. The one or more moving agitators 470B, in one or more embodiments, are configured to assist in the mixing of the mixed inlet fluid 460. In the embodiment of FIG. 4B, the one or more moving agitators 470B are one or more rotating impellors. For example, the one or more rotating impellors may be configured to simply rotate based upon the fluid flowing thereover, or in another embodiment may be powered to rotate.

Figure 4C:
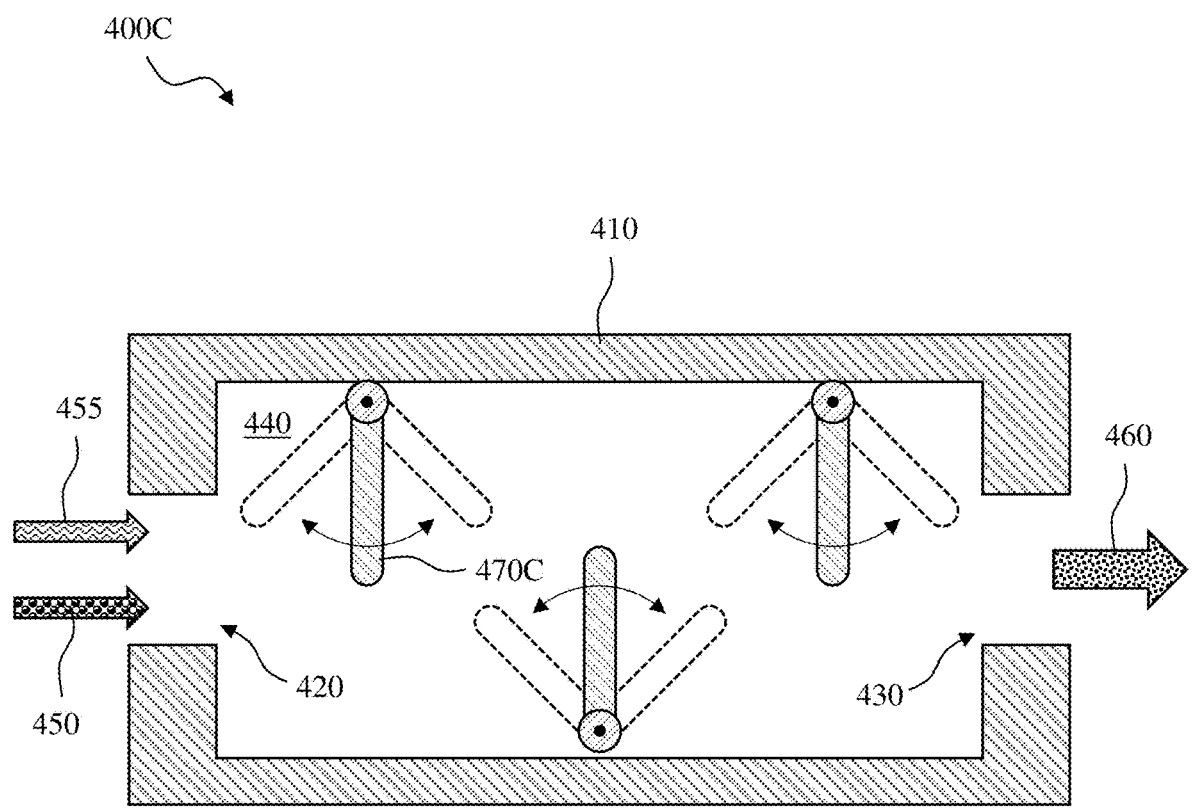

Turning now to FIG. 4C, illustrated is an alternative embodiment of a fluid mixer 400C designed, manufactured, and operated according to another embodiment of the disclosure. The fluid mixer 400C is similar in many respects to the fluid mixer 400B of FIG. 4B. Accordingly, like reference numbers have been used to indicate similar, if not identical, features. The fluid mixer 400C differs, for the most part, from the fluid mixer 400B in that the fluid mixer 400C employs one or more moving flappers as its one or more moving agitators 470C. The one or more moving flappers (e.g., power or non-powered), in one or more embodiments, are configured to assist in the mixing of the mixed inlet fluid 460.

Figure 4D:
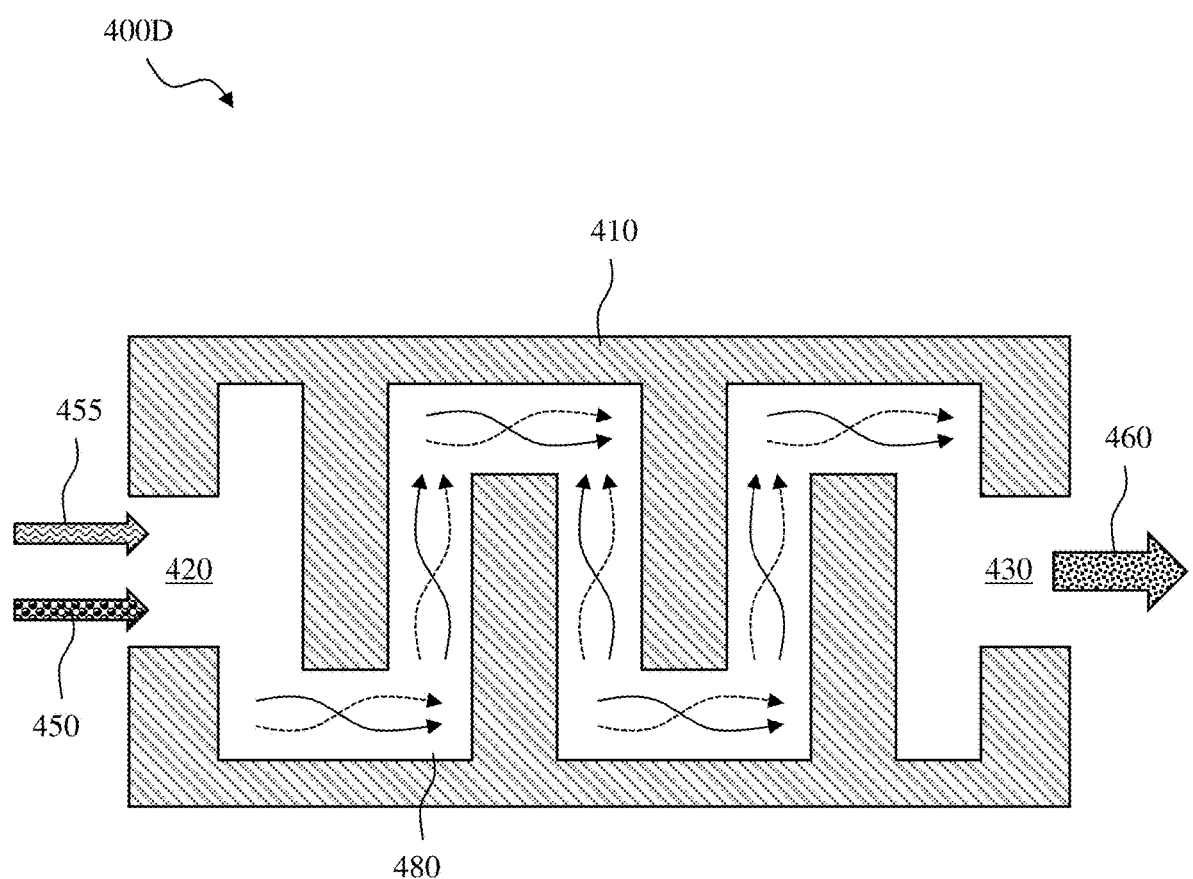

Turning now to FIG. 4D, illustrated is an alternative embodiment of a fluid mixer 400D designed, manufactured, and operated according to another embodiment of the disclosure. The fluid mixer 400D is similar in many respects to the fluid mixer 400A of FIG. 4A. Accordingly, like reference numbers have been used to indicate similar, if not identical, features. The fluid mixer 400D differs, for the most part, from the fluid mixer 400A in that the fluid mixer 400D does not include a fluid mixing chamber 440, but includes a tortious mixing path 480 between the fluid mixer inlet 420 and the fluid mixer outlet 430. The tortious mixing path 480, in the illustrated embodiment, is configured to provide the mixed inlet fluid 460. The embodiment of FIG. 4D employs a series of obstructions and right angles forming the tortious mixing path 480 and providing the mixing. Nevertheless, other embodiments may exist wherein other shapes and/or paths are used to provide the tortious mixing path 480, and thus the mixing.

Figure 4E:
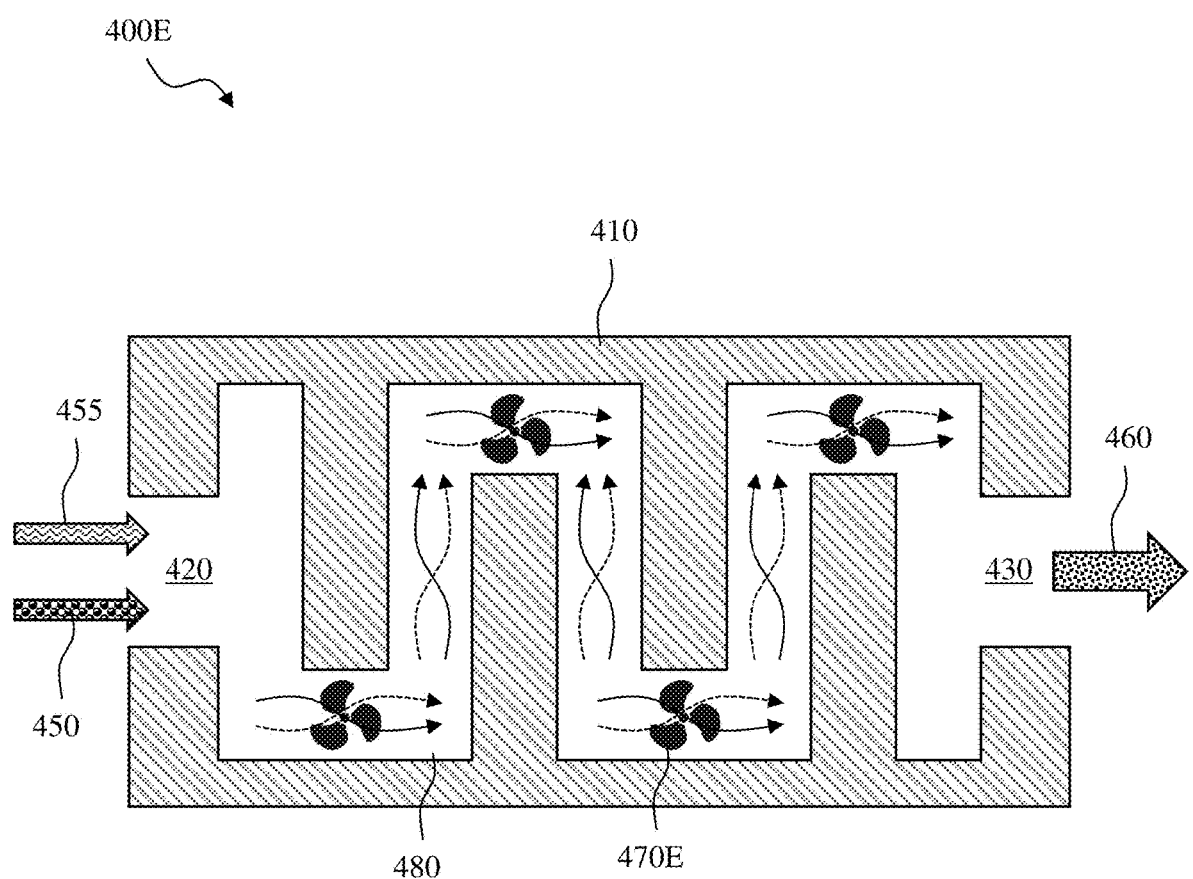

Turning now to FIG. 4E, illustrated is an alternative embodiment of a fluid mixer 400E designed, manufactured, and operated according to another embodiment of the disclosure. The fluid mixer 400E is similar in many respects to the fluid mixer 400D of FIG. 4D. Accordingly, like reference numbers have been used to indicate similar, if not identical, features. The fluid mixer 400E differs, for the most part, from the fluid mixer 400D in that the fluid mixer 400E includes one or more moving agitators 470E designed as rotating impellors positioned within the tortious mixing path 480.

Figure 4F:
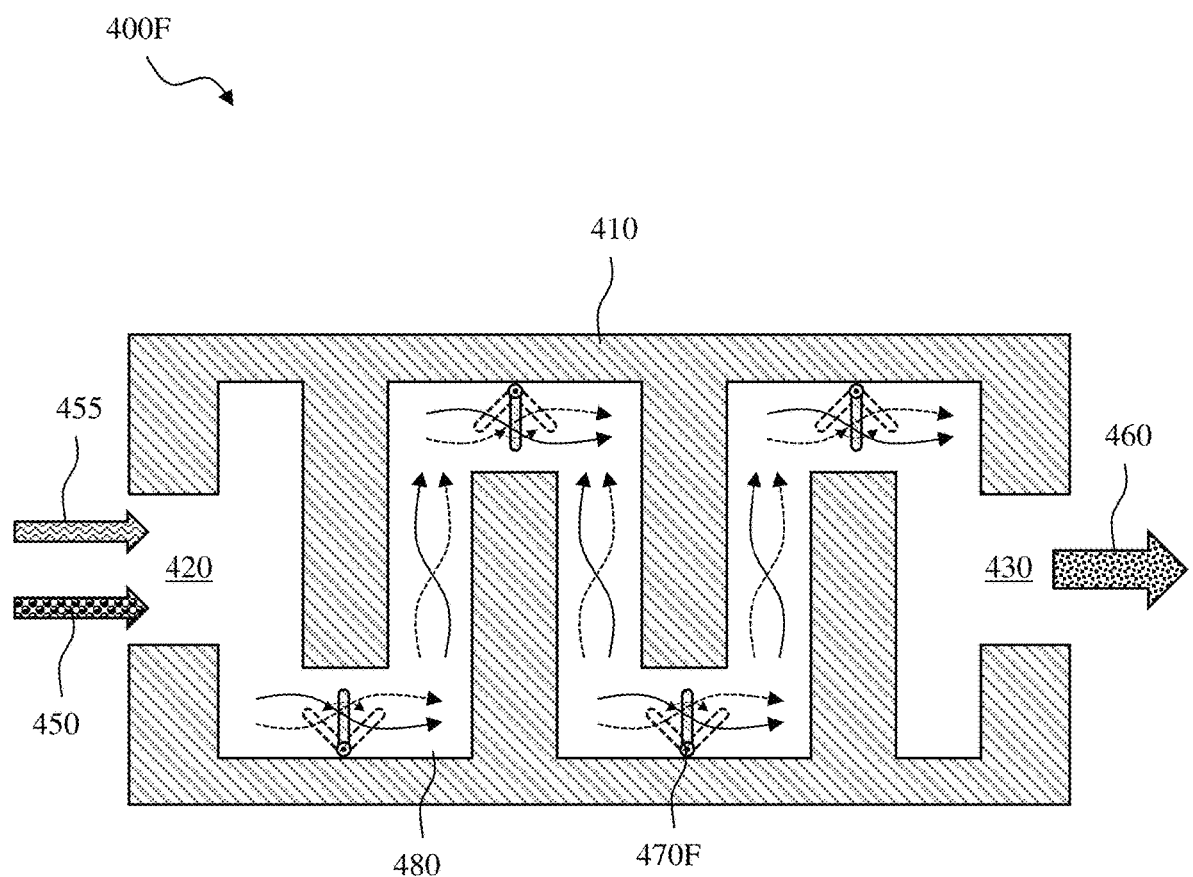

Turning now to FIG. 4F, illustrated is an alternative embodiment of a fluid mixer 400F designed, manufactured, and operated according to another embodiment of the disclosure. The fluid mixer 400F is similar in many respects to the fluid mixer 400D of FIG. 4D. Accordingly, like reference numbers have been used to indicate similar, if not identical, features. The fluid mixer 400F differs, for the most part, from the fluid mixer 400D in that the fluid mixer 400F includes one or more moving agitators 470F designed as moving flappers positioned within the tortious mixing path 480.

Figure 5A:
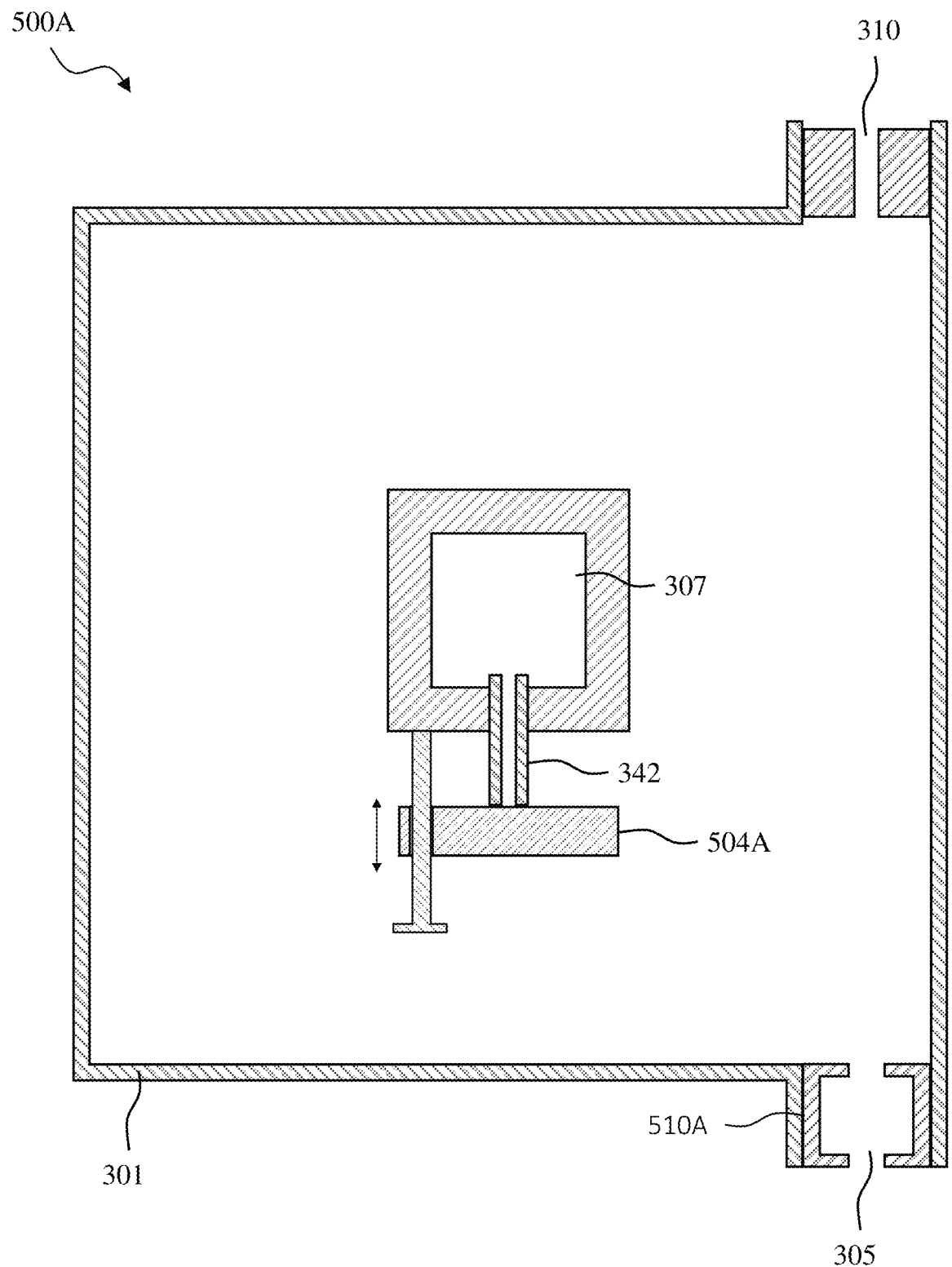
FIGS. 5A and 5B illustrate cross-sectional views of an alternative embodiments of a fluid flow control device designed, manufactured, and operated according to one or more embodiments of the disclosure.

Turning to FIG. 5A, illustrated is a cross-sectional view of an alternative embodiment of a fluid flow control device 500A designed, manufactured, and operated according to one or more embodiments of the disclosure. The fluid flow control device 500A is similar in many respects to the fluid flow control device 300 of FIG. 3. Accordingly, like reference numbers have been used to indicate similar, if not identical, features. The fluid flow control device 500A differs, for the most part, from the fluid flow control device 300, in that the fluid flow control device 500A does not employ the rotatable component 308. Alternatively, the fluid flow control device 500A employs a single paddle shaped float 504A. The single paddle shaped float 504A, in at least the illustrated embodiment, is operable to slide (e.g., linearly slide in one embodiment) between the open and closed positions, for example based upon the density of the fluid within the fluid chamber 301. In the embodiment of FIG. 5A, the single paddle shaped float 504A is configured to float upward to the closed position and sink downward to the open position, for example based upon the density of the fluid within the fluid chamber 301. The fluid flow control device 500A additionally includes a fluid mixer 510A designed, manufactured and/or operated according to one or more embodiments of the disclosure.

Figure 5B:
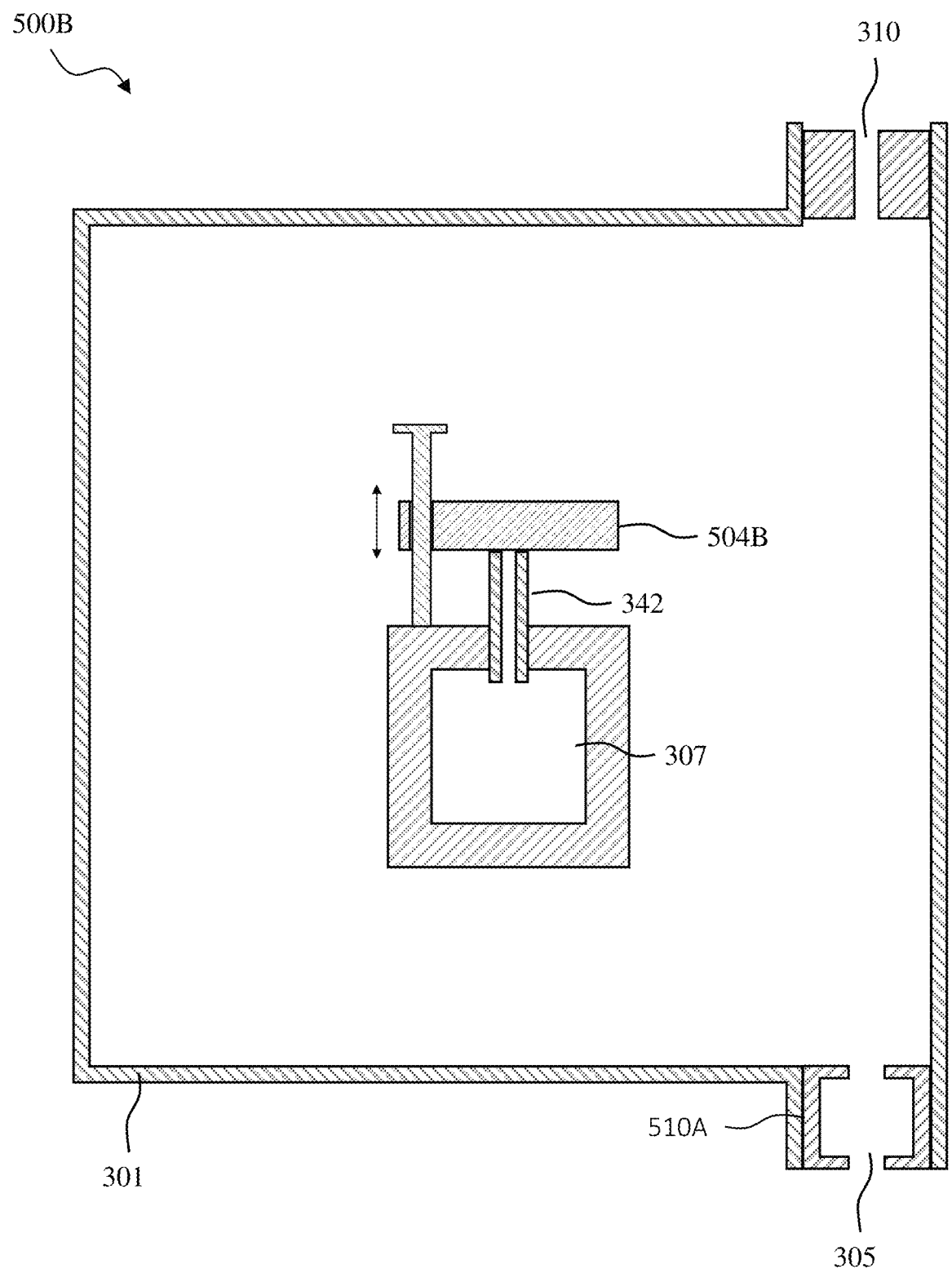

Turning to FIG. 5B, illustrated is a cross-sectional view of an alternative embodiment of a fluid flow control device 500B designed, manufactured, and operated according to one or more embodiments of the disclosure. The fluid flow control device 500B is similar in many respects to the fluid flow control device 500A of FIG. 5A. Accordingly, like reference numbers have been used to indicate similar, if not identical, features. The fluid flow control device 500B differs, for the most part, from fluid flow control device 500A, in that the single paddle shaped float 504B is configured to float upward to the open position and sink downward to the closed position, for example based upon the density of the fluid within the fluid chamber 301.

Figure 6A:
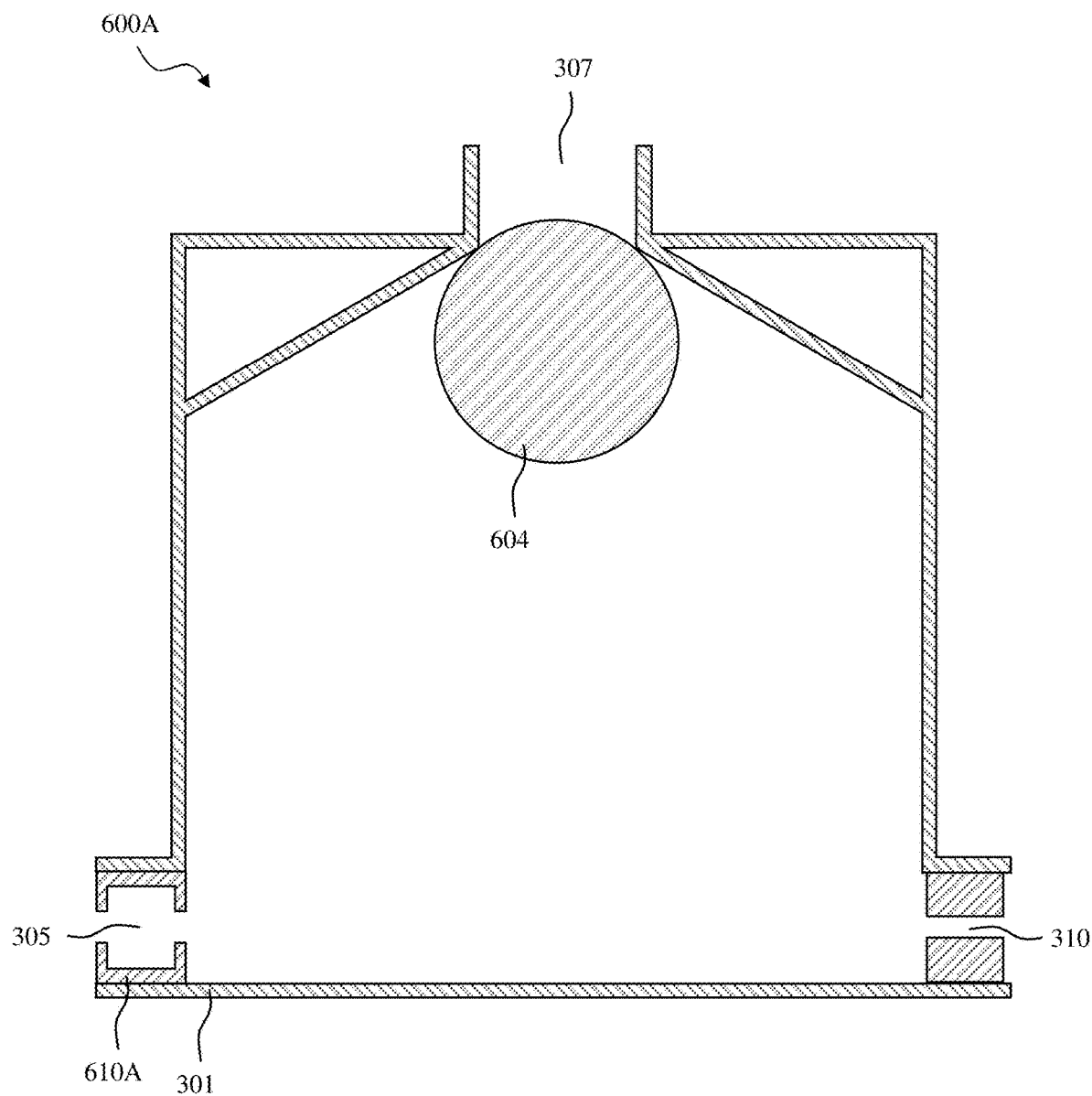
FIGS. 6A and 6B illustrate cross-sectional views of an alternative embodiment of a fluid flow control device designed, manufactured, and operated according to one or more embodiments of the disclosure.
Figure 6B:
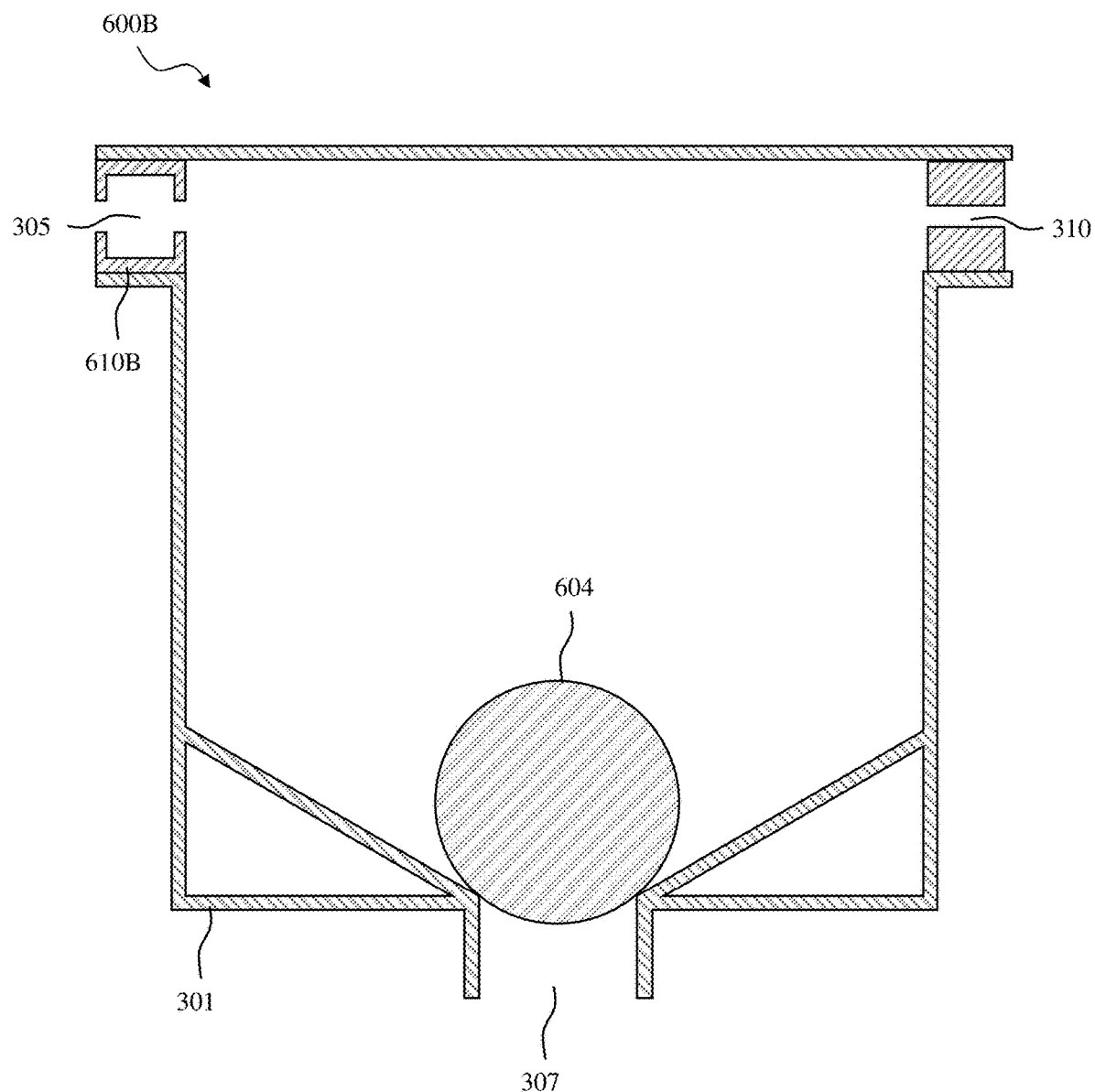

Turning to FIG. 6A, illustrated is a cross-sectional view of an alternative embodiment of a fluid flow control device 600A designed, manufactured, and operated according to one or more embodiments of the disclosure. The fluid flow control device 600A is similar in many respects to the fluid flow control device 300 of FIG. 3. Accordingly, like reference numbers have been used to indicate similar, if not identical, features. The fluid flow control device 600A differs, for the most part, from the fluid flow control device 300, in that the fluid flow control device 600A does not employ the rotatable component 308. Alternatively, the fluid flow control device 600A employs a single spherical shaped float 604. The single spherical shaped float 604, in at least the illustrated embodiment, is operable to float upward to close the fluid outlet 307 when its density is less than the fluid density of a desirable fluid, or sink downward to open the fluid outlet 307 when its density is greater than the fluid density of the desirable fluid. It should be apparent that the fluid flow control device 600A could be reversed so that the sphere 604 restricts the fluid outlet 307 when its density is greater than the fluid density of a desired fluid, such as shown in FIG. 6B. The fluid flow control devices 600A, 600B additionally includes a fluid mixer 610A designed, manufactured and/or operated according to one or more embodiments of the disclosure.

Figure 7:
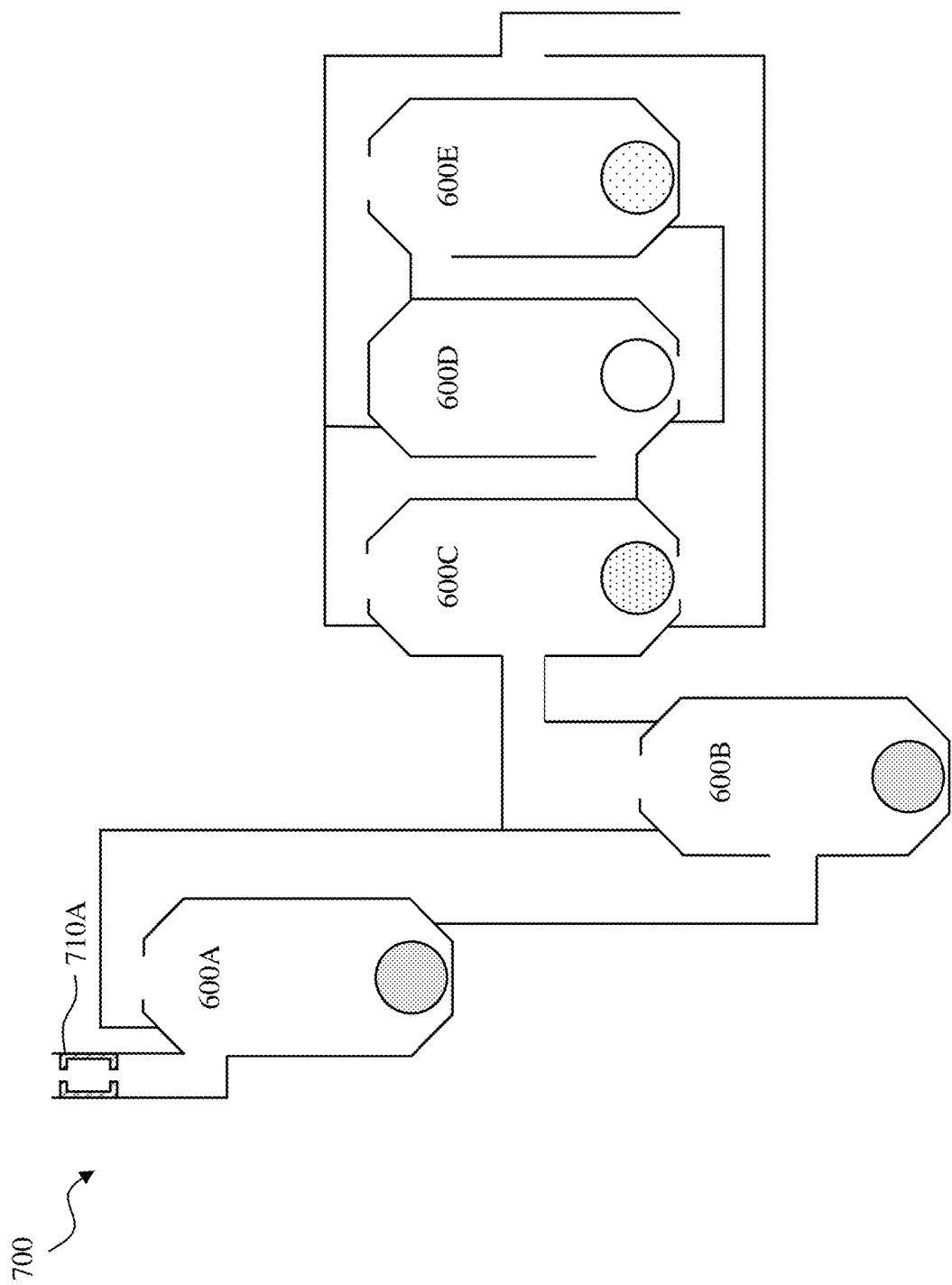
FIG. 7 illustrates an orientation dependent inflow control apparatus designed, manufactured, and operated according to one or more embodiments of the disclosure.

FIG. 7 illustrates an orientation dependent inflow control apparatus 700 designed, manufactured and operated according to one or more embodiments of the disclosure. In the embodiment of FIG. 7, multiple fluid flow control devices 600A-600E are stacked to assist with certain orientation issues that may exist when the fluid flow control device 700 is positioned on a tubular downhole. The multiple fluid flow control devices 600A-600E may also be used to discriminate fluid flow based upon more than just two different densities. The orientation dependent inflow control apparatus 700 additionally includes a fluid mixer 710A designed, manufactured and/or operated according to one or more embodiments of the disclosure.

Figure 8:
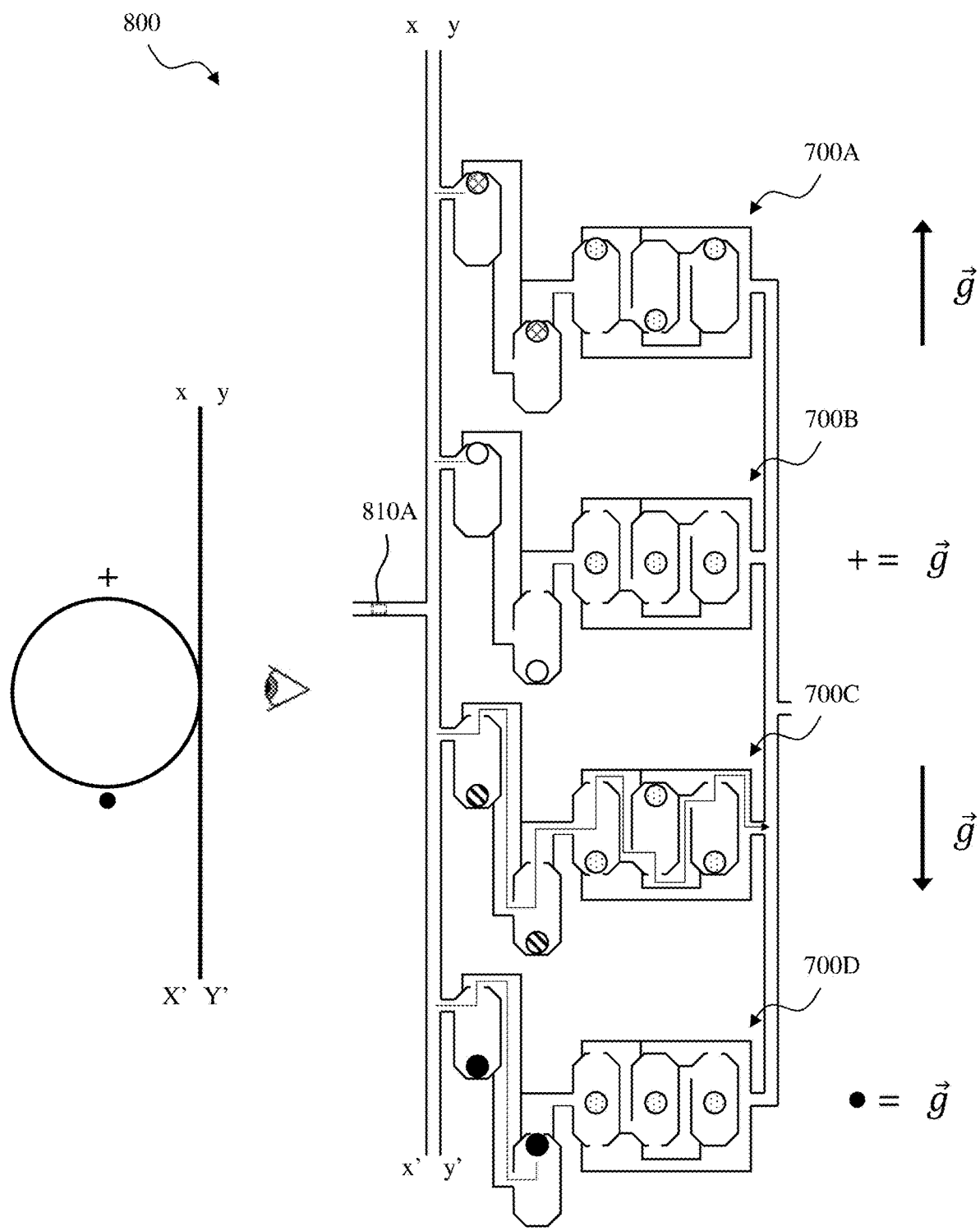
FIG. 8 illustrates a rolled-out view (360°) of a device comprising four orientation dependent inflow control apparatuses equidistantly distributed around the perimeter outside of a basepipe (not shown).

FIG. 8 illustrates a rolled-out view (360°) of a device 800 comprising four orientation dependent inflow control apparatuses 700A-700D equidistantly distributed around the perimeter outside of a basepipe (not shown). In FIG. 8 the reference indications x and x' are connected to one another, as well as the reference indications y and y' are connected to one another. Each of the four orientation dependent inflow control apparatuses 700A-700D is in fluid communication with a corresponding density control valve to form a density control valve system. The orientation of each of the four orientation dependent inflow control apparatuses 700A-700D is indicated by the g-vectors (g) where the indication + is to be understood to be in a direction into the drawing, the downward arrow is in a direction vertically down, the • is in a direction out of the drawing and the upward arrow is in a direction vertically up. The device 800 additionally includes one or more fluid mixers 810A designed, manufactured and/or operated according to one or more embodiments of the disclosure.

Aspects disclosed herein include:

A. A fluid flow control device, the fluid flow control device including: 1) an inlet port, 2) an outlet port, 3) a fluid chamber positioned between the inlet port and the outlet port, 4) a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid, and 5) a fluid mixer positioned uphole of the fluid chamber, the fluid mixer configured to receive unmixed or partially mixed fluid and turn it to mixed inlet fluid prior to the mixed inlet fluid encountering the fluid chamber.

B. A well system, the well system including: 1) a wellbore formed through a subterranean formation, 2) a tubing string positioned within the wellbore, 3) a fluid flow control device coupled to the tubing string, the fluid flow control device including: a) an inlet port, b) an outlet port, c) a fluid chamber positioned between the inlet port and the outlet port, d) a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid, and e) a fluid mixer positioned uphole of the fluid chamber, the fluid mixer configured to receive unmixed or partially mixed fluid and turn it to mixed inlet fluid prior to the mixed inlet fluid encountering the fluid chamber.

C. A method, the method including: 1) positioning a fluid flow control device coupled to tubing string within a wellbore formed through a subterranean formation, the fluid flow control device including: a) an inlet port, b) an outlet port, c) a fluid chamber positioned between the inlet port and the outlet port, d) a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid, and e) a fluid mixer positioned uphole of the fluid chamber, the fluid mixer configured to receive unmixed or partially mixed fluid and turn it to mixed inlet fluid prior to the mixed inlet fluid encountering the fluid chamber, and 2) producing hydrocarbons through the fluid flow control device.

Aspects A, B, C and D may have one or more of the following additional elements in combination: Element 1: wherein the fluid mixer forms at least a portion of the inlet port. Element 2: wherein the fluid mixer is positioned uphole of the inlet port. Element 3: wherein the fluid mixer is positioned a distance (d) less than 100 cm uphole of the inlet port. Element 4: wherein the fluid mixer is positioned a distance (d) less than 50 cm uphole of the inlet port. Element 5: wherein the fluid mixer is a fluid mixer insert. Element 6: wherein the fluid mixer includes a housing having a fluid mixer inlet and a fluid mixer outlet separated by a fluid mixing chamber, the fluid mixer inlet having a cross-sectional ($A_i$), the fluid mixer outlet having a cross-sectional area ($A_o$), and the fluid mixing chamber having a cross-sectional area ($A_c$), wherein the cross-sectional area ($A_c$) of the fluid mixing chamber is at least 3 times the cross-sectional area ($A_i$) of the fluid mixer inlet or the cross-sectional area ($A_o$) of the fluid mixer outlet. Element 7: wherein the fluid mixer includes a housing having a fluid mixer inlet and a fluid mixer outlet separated by a fluid mixing chamber, a cross-sectional area of the chamber ($A_c$) at least 5 times a cross-sectional area of the fluid mixer inlet ($A_i$) or a cross-sectional area of the fluid mixer outlet ($A_o$). Element 8: further including one or more moving agitators positioned within the fluid mixing chamber. Element 9: wherein the one or more moving agitators are one or more rotating impellors. Element 10: wherein the one or more moving agitators are one or more moving flappers. Element 11: wherein the fluid mixer includes a housing having a fluid mixer inlet, a fluid mixer outlet, and a tortious mixing path between the fluid mixer inlet and the fluid mixer outlet. Element 12: further including one or more moving agitators positioned within the tortious mixing path. Element 13: wherein the one or more agitators are one or more rotating impellors. Element 14: wherein the one or more agitators are one or more moving flappers. Element 15: further including a turbine positioned within the fluid chamber, the turbine configured to spin upon receiving the mixed inlet fluid. Element 16: wherein producing hydrocarbons through the fluid flow control device includes receiving the unmixed or partially mixed fluid, turning the unmixed or partially mixed fluid into the mixed fluid, providing the mixed fluid to the fluid chamber, and moving the float between the open position and closed position based upon a mixed fluid net density of the mixed fluid.

Those skilled in the art to which this application relates will appreciate that other and further additions, deletions, substitutions, and modifications may be made to the described embodiments.

What is claimed is:

1. A fluid flow control device, comprising:
   an inlet port;
   an outlet port;
   a fluid chamber positioned between the inlet port and the outlet port;
   a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid; and
   a fluid mixer positioned uphole of the fluid chamber, the fluid mixer configured to receive unmixed or partially mixed fluid and turn it to mixed inlet fluid prior to the mixed inlet fluid encountering the fluid chamber, wherein the fluid mixer is positioned a distance (d) less than 100 cm uphole of the inlet port.

2. The fluid flow control device as recited in claim 1, wherein the fluid mixer forms at least a portion of the inlet port.

3. The fluid flow control device as recited in claim 1, wherein the fluid mixer is positioned the distance (d) less than 50 cm uphole of the inlet port.

4. The fluid flow control device as recited in claim 1, wherein the fluid mixer is a fluid mixer insert.

5. The fluid flow control device as recited in claim 1, wherein the fluid mixer includes a housing having a fluid mixer inlet and a fluid mixer outlet separated by a fluid mixing chamber, the fluid mixer inlet having a cross-sectional ($A_i$), the fluid mixer outlet having a cross-sectional area ($A_o$), and the fluid mixing chamber having a cross-sectional area ($A_c$), wherein the cross-sectional area ($A_c$) of the fluid mixing chamber is at least 3 times the cross-sectional area ($A_i$) of the fluid mixer inlet or the cross-sectional area ($A_o$) of the fluid mixer outlet.

6. The fluid flow control device as recited in claim 5, wherein the fluid mixer includes a housing having a fluid mixer inlet and a fluid mixer outlet separated by a fluid mixing chamber, the fluid mixer inlet having a cross-sectional (Ai), the fluid mixer outlet having a cross-sectional area (Ao), and the fluid mixing chamber having a cross-sectional area (Ac), wherein the cross-sectional area of the chamber ($A_c$) is at least 5 times the cross-sectional area of the fluid mixer inlet ($A_i$) or the cross-sectional area of the fluid mixer outlet ($A_o$).

7. The fluid flow control device as recited in claim 5, further including one or more moving agitators positioned within the fluid mixing chamber.

8. The fluid flow control device as recited in claim 7, wherein the one or more moving agitators are one or more rotating impellors.

9. The fluid flow control device as recited in claim 7, wherein the one or more moving agitators are one or more moving flappers.

10. The fluid flow control device as recited in claim 1, wherein the fluid mixer includes a housing having a fluid mixer inlet, a fluid mixer outlet, and a tortious mixing path between the fluid mixer inlet and the fluid mixer outlet.

11. The fluid flow control device as recited in claim 10, further including one or more moving agitators positioned within the tortious mixing path.

12. The fluid flow control device as recited in claim 11, wherein the one or more agitators are one or more rotating impellors.

13. The fluid flow control device as recited in claim 11, wherein the one or more agitators are one or more moving flappers.

14. A well system, comprising:
    a wellbore formed through a subterranean formation;
    a tubing string positioned within the wellbore; and
    a fluid flow control device coupled to the tubing string, the fluid flow control device including:
      an inlet port;
      an outlet port;
      a fluid chamber positioned between the inlet port and the outlet port;
      a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid; and
      a fluid mixer positioned uphole of the fluid chamber, the fluid mixer configured to receive unmixed or partially mixed fluid and turn it to mixed inlet fluid prior to the mixed inlet fluid encountering the fluid chamber, wherein the fluid mixer is positioned a distance (d) less than 100 cm uphole of the inlet port.

15. The well system as recited in claim 14, further including a turbine positioned within the fluid chamber, the turbine configured to spin upon receiving the mixed inlet fluid.

16. The well system as recited in claim 14, wherein the fluid mixer forms at least a portion of the inlet port.

17. The well system as recited in claim 14, wherein the distance (d) is less than 50 cm uphole of the inlet port.

18. The well system as recited in claim 14, wherein the fluid mixer is a fluid mixer insert.

19. The well system as recited in claim 14, wherein the fluid mixer includes a housing having a fluid mixer inlet and a fluid mixer outlet separated by a fluid mixing chamber, the fluid mixer inlet having a cross-sectional ($A_i$), the fluid mixer outlet having a cross-sectional area ($A_o$), and the fluid mixing chamber having a cross-sectional area ($A_c$), wherein the cross-sectional area ($A_c$) of the fluid mixing chamber is at least 3 times the cross-sectional area ($A_i$) of the fluid mixer inlet or the cross-sectional area ($A_o$) of the fluid mixer outlet.

20. The well system as recited in claim 19, wherein the fluid mixer includes a housing having a fluid mixer inlet and a fluid mixer outlet separated by a fluid mixing chamber, the fluid mixer inlet having a cross-sectional (Ai), the fluid mixer outlet having a cross-sectional area (Ao), and the fluid mixing chamber having a cross-sectional area (Ac), wherein the across-sectional area of the chamber ($A_c$) is at least 5 times a cross-sectional area of the fluid mixer inlet ($A_i$) or the cross-sectional area of the fluid mixer outlet ($A_o$).

21. The well system as recited in claim 20, further including one or more moving agitators positioned within the fluid mixing chamber.

22. The well system as recited in claim 21, wherein the one or more moving agitators are one or more rotating impellors.

23. The well system as recited in claim 21, wherein the one or more moving agitators are one or more moving flappers.

24. The well system as recited in claim 14, wherein the fluid mixer includes a housing having a fluid mixer inlet, a fluid mixer outlet, and a tortious mixing path between the fluid mixer inlet and the fluid mixer outlet.

25. The well system as recited in claim 24, further including one or more moving agitators positioned within the tortious mixing path.

26. The well system as recited in claim 25, wherein the one or more agitators are one or more rotating impellors.

27. The well system as recited in claim 25, wherein the one or more agitators are one or more moving flappers.

28. A method, comprising:
  positioning a fluid flow control device coupled to tubing string within a wellbore formed through a subterranean formation, the fluid flow control device including:
    an inlet port;
    an outlet port;
    a fluid chamber positioned between the inlet port and the outlet port;
    a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid; and
    a fluid mixer positioned uphole of the fluid chamber, the fluid mixer configured to receive unmixed or partially mixed fluid and turn it to mixed inlet fluid prior to the mixed inlet fluid encountering the fluid chamber, wherein the fluid mixer is positioned a distance (d) less than 100 cm uphole of the inlet port; and
  producing hydrocarbons through the fluid flow control device.

29. The method as recited in claim 28, wherein producing hydrocarbons through the fluid flow control device includes receiving the unmixed or partially mixed fluid, turning the unmixed or partially mixed fluid into the mixed fluid, providing the mixed fluid to the fluid chamber, and moving the float between the open position and closed position based upon a mixed fluid net density of the mixed fluid.

30. A fluid flow control device, comprising:
  an inlet port;
  an outlet port;
  a fluid chamber positioned between the inlet port and the outlet port;
  a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid; and
  fluid mixer positioned uphole of the fluid chamber, the fluid mixer configured to receive unmixed or partially mixed fluid and turn it to mixed inlet fluid prior to the mixed inlet fluid encountering the fluid chamber, wherein the fluid mixer includes a housing having a fluid mixer inlet and a fluid mixer outlet separated by a fluid mixing chamber, the fluid mixer inlet having a cross-sectional ($A_i$), the fluid mixer outlet having a cross-sectional area ($A_o$), and the fluid mixing chamber having a cross-sectional area ($A_c$), wherein the cross-sectional area of the chamber ($A_c$) is at least 5 times the cross-sectional area of the fluid mixer inlet ($A_i$) or the cross-sectional area of the fluid mixer outlet ($A_o$).

31. A well system, comprising:
  a wellbore formed through a subterranean formation;
  a tubing string positioned within the wellbore; and
  a fluid flow control device coupled to the tubing string, the fluid flow control device including:
    an inlet port;
    an outlet port;
    a fluid chamber positioned between the inlet port and the outlet port;
    a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid; and
    a fluid mixer positioned uphole of the fluid chamber, the fluid mixer configured to receive unmixed or partially mixed fluid and turn it to mixed inlet fluid prior to the mixed inlet fluid encountering the fluid chamber, wherein the fluid mixer includes a housing having a fluid mixer inlet and a fluid mixer outlet separated by a fluid mixing chamber, the fluid mixer inlet having a cross-sectional ($A_i$), the fluid mixer outlet having a cross-sectional area ($A_o$), and the fluid mixing chamber having a cross-sectional area ($A_c$), wherein the cross-sectional area of the chamber ($A_c$) is at least 5 times the cross-sectional area of the fluid mixer inlet ($A_i$) or the cross-sectional area of the fluid mixer outlet ($A_o$).

32. A method, comprising:

positioning a fluid flow control device coupled to tubing string within a wellbore formed through a subterranean formation, the fluid flow control device including:

an inlet port;

an outlet port;

a fluid chamber positioned between the inlet port and the outlet port;

a float positioned within the fluid chamber, the float movable between an open position that allows fluid flow through the outlet port and a closed position that restricts fluid flow through the outlet port, the float having a net density that is between a first density of a desired fluid and a second density of an undesired fluid, such that the float may control fluid flow through the fluid flow control device when encountering the desired fluid or the undesired fluid; and a fluid mixer positioned uphole of the fluid chamber, the fluid mixer configured to receive unmixed or partially mixed fluid and turn it to mixed inlet fluid prior to the mixed inlet fluid encountering the fluid chamber, wherein the fluid mixer includes a housing having a fluid mixer inlet and a fluid mixer outlet separated by a fluid mixing chamber, the fluid mixer inlet having a cross-sectional ($A_i$), the fluid mixer outlet having a cross-sectional area ($A_o$), and the fluid mixing chamber having a cross-sectional area ($A_c$), wherein the cross-sectional area of the chamber ($A_c$) is at least 5 times the cross-sectional area of the fluid mixer inlet ($A_i$) or the cross-sectional area of the fluid mixer outlet ($A_o$); and producing hydrocarbons through the fluid flow control device.

\* \* \* \* \*